No. 761,789. PATENTED JUNE 7, 1904.
C. SCHROETER.
COKE OVEN.
APPLICATION FILED APR. 20, 1903.
NO MODEL. 8 SHEETS—SHEET 1.
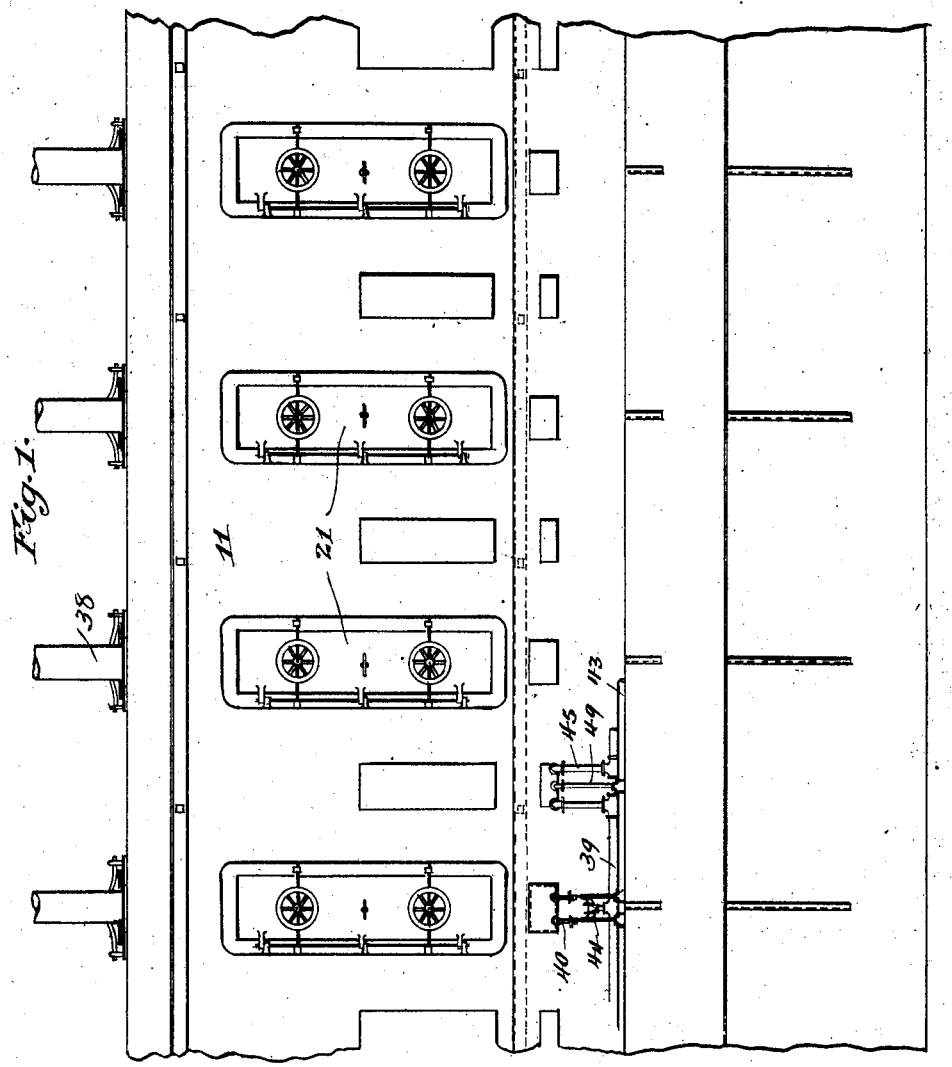

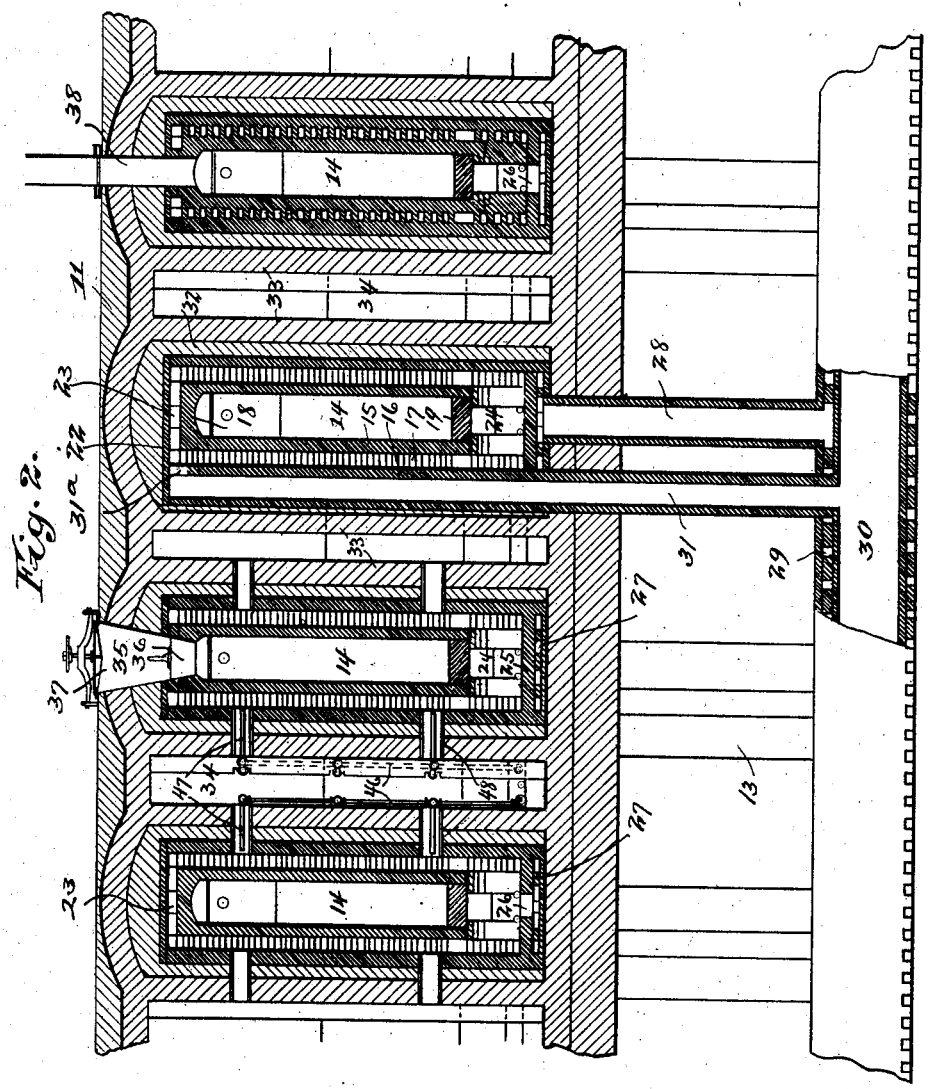

No. 761,789. PATENTED JUNE 7, 1904.
C. SCHROETER.
COKE OVEN.
APPLICATION FILED APR. 20, 1903.
NO MODEL. 8 SHEETS—SHEET 3.
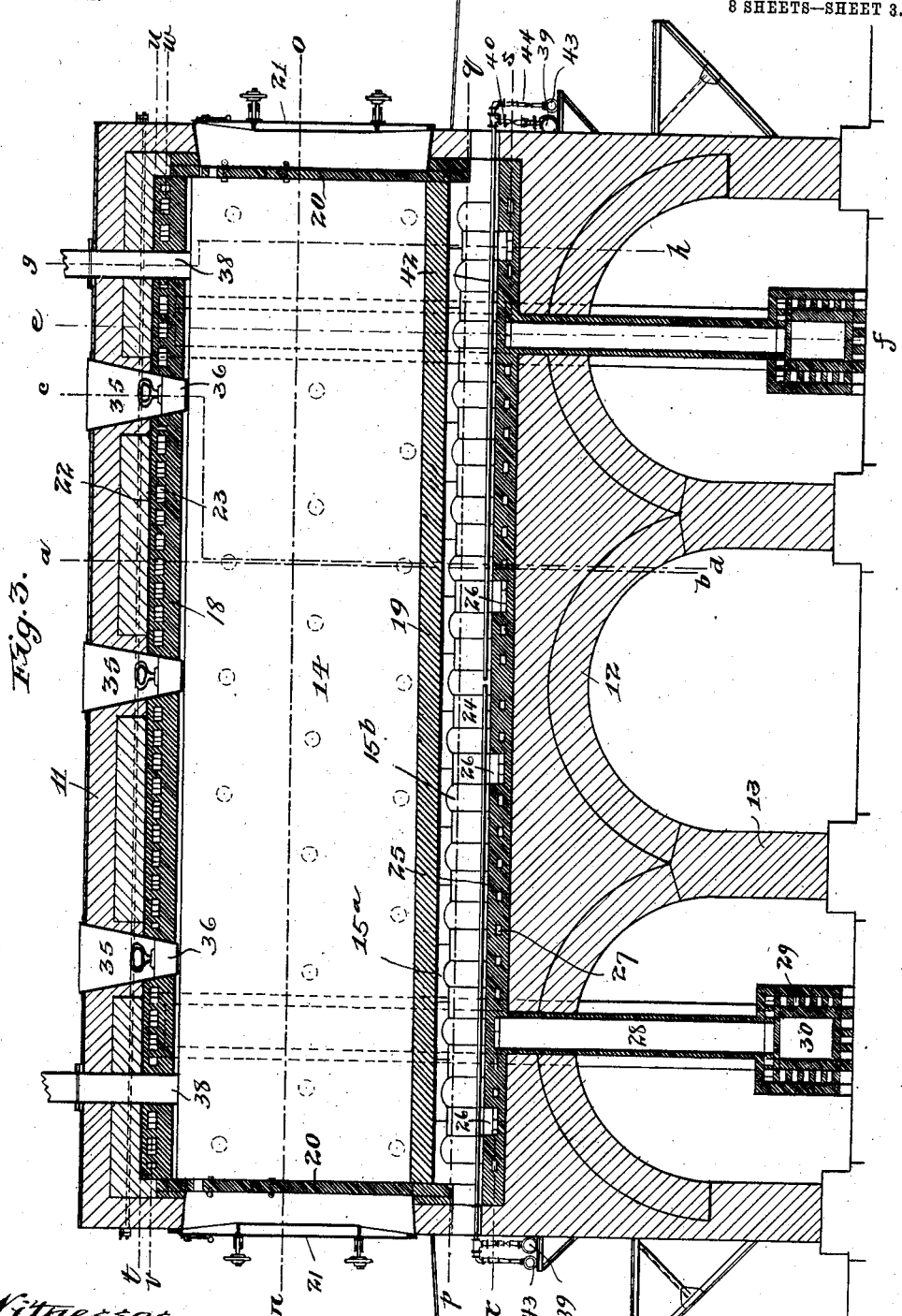

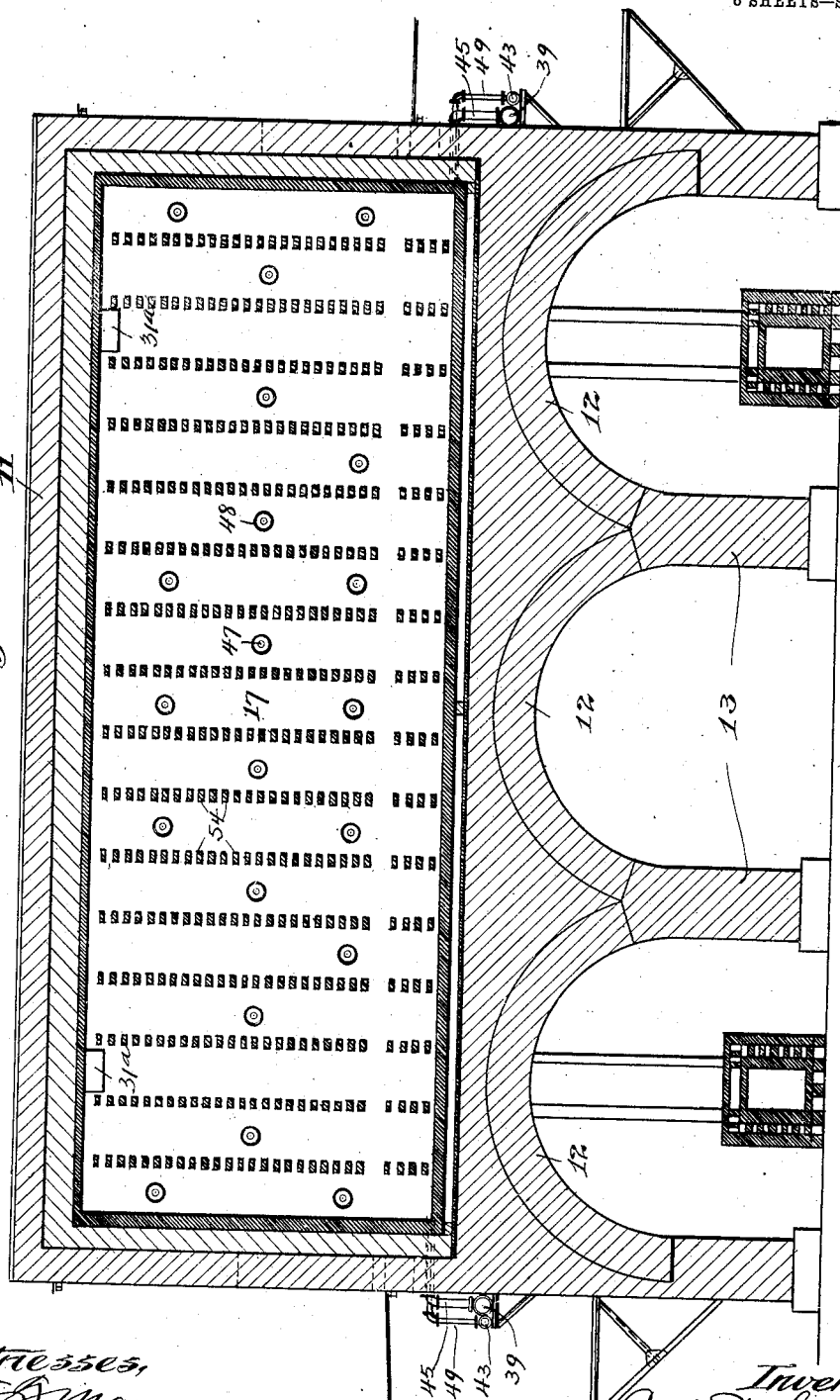

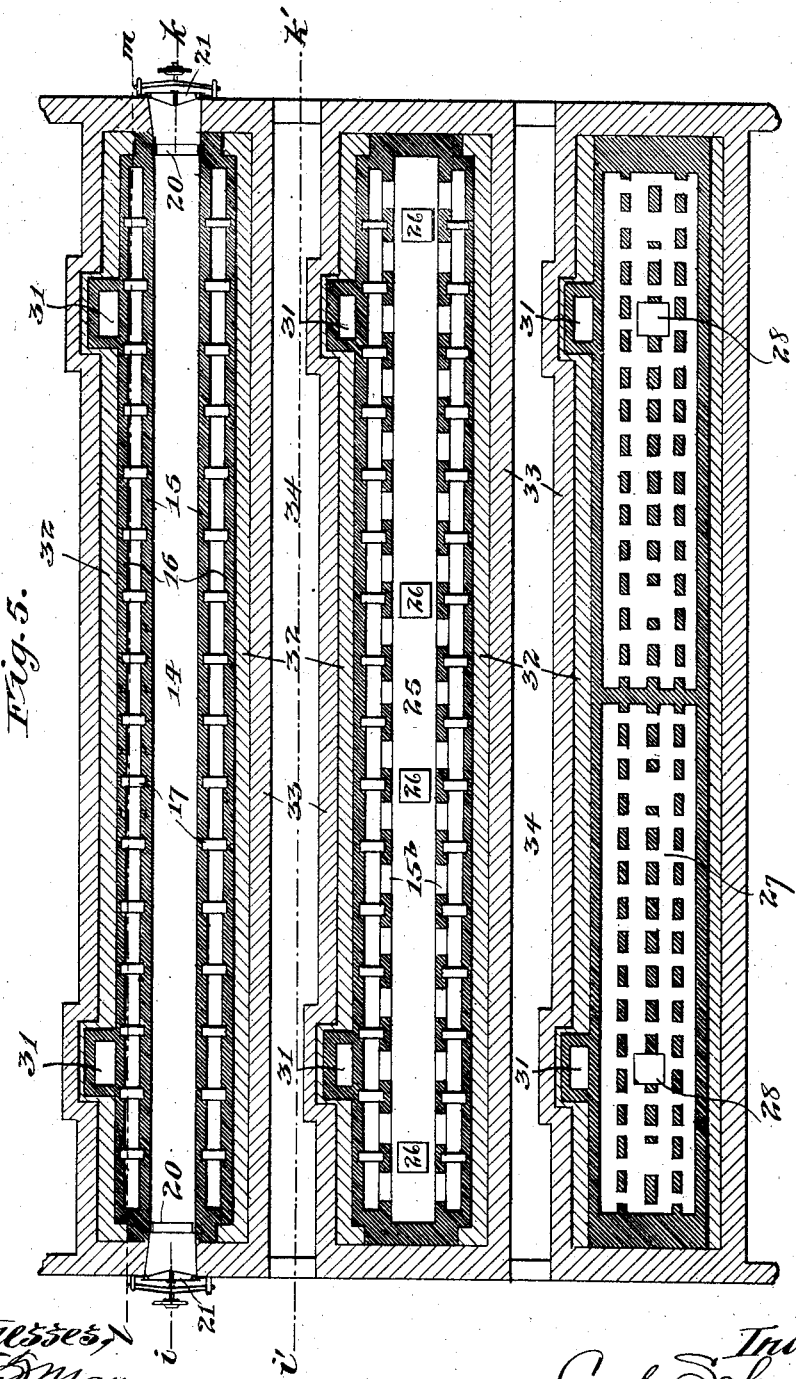

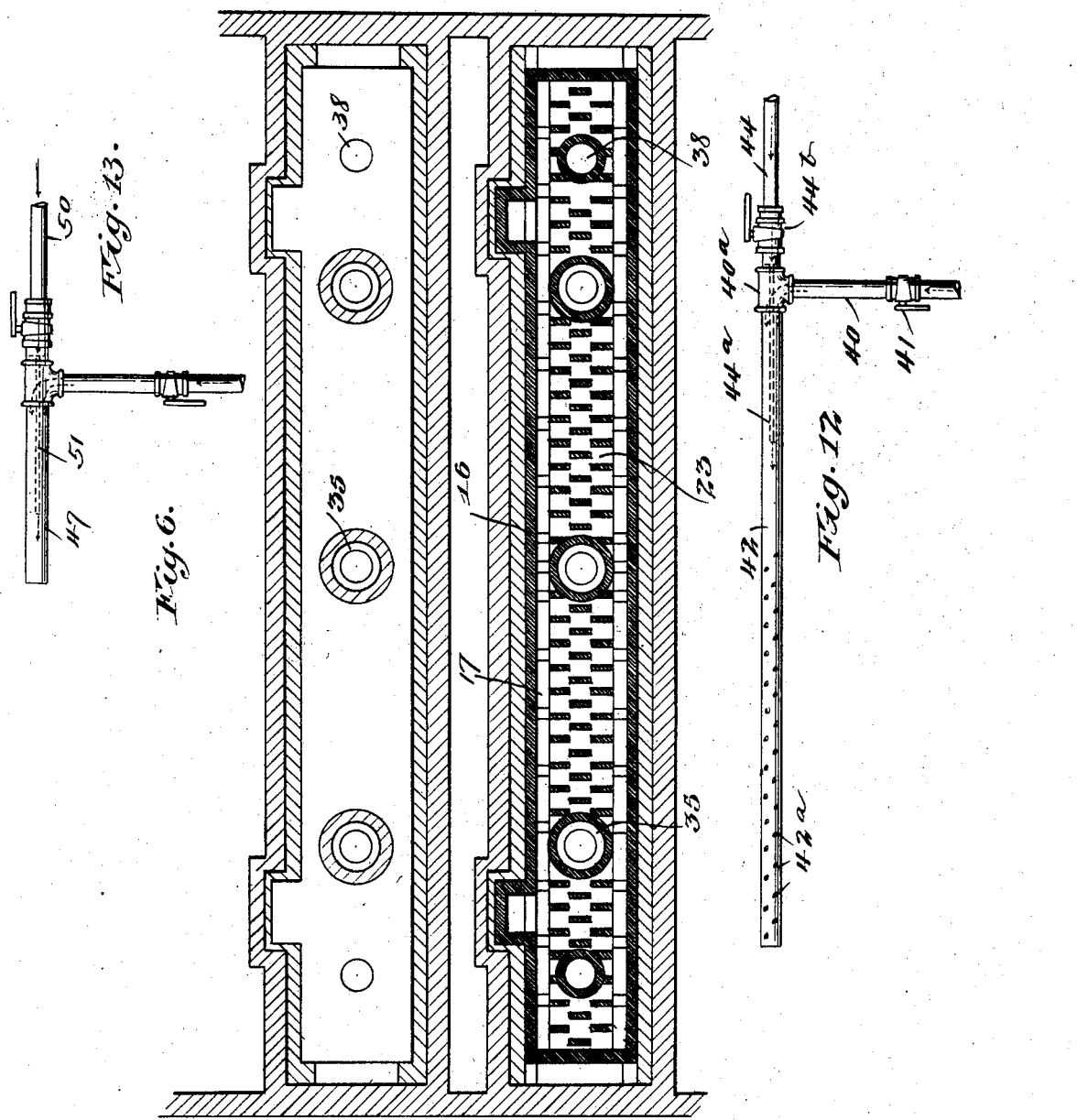

No. 761,789. PATENTED JUNE 7, 1904.
C. SCHROETER.
COKE OVEN.
APPLICATION FILED APR. 20, 1903.
NO MODEL. 8 SHEETS—SHEET 7.
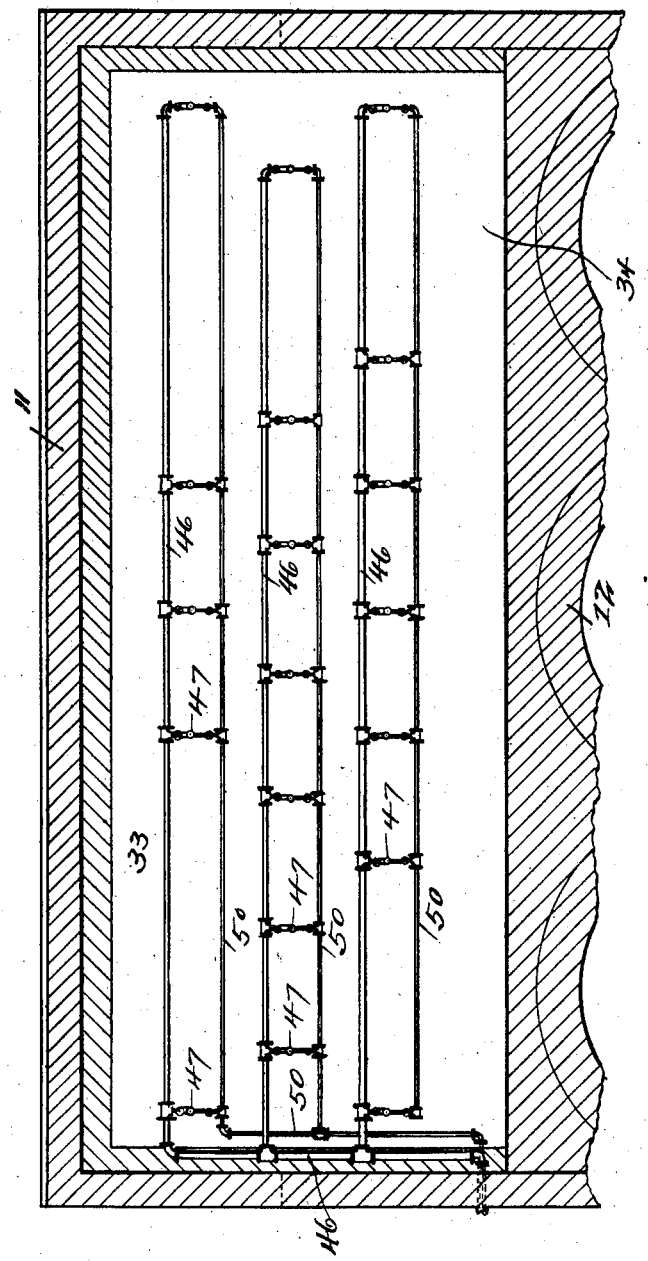

No. 761,789. PATENTED JUNE 7, 1904.
C. SCHROETER.
COKE OVEN.
APPLICATION FILED APR. 20, 1903.
NO MODEL. 8 SHEETS—SHEET 8.
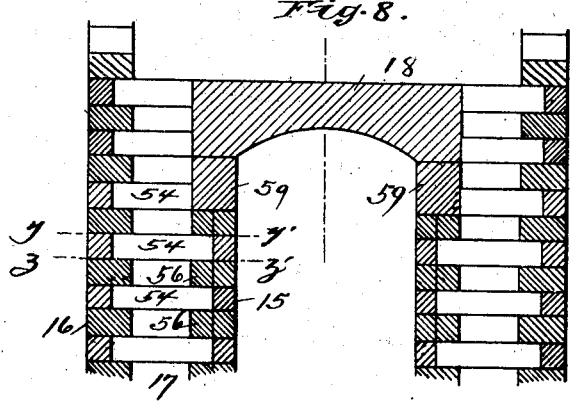
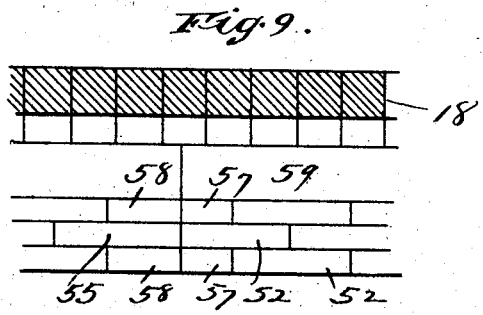
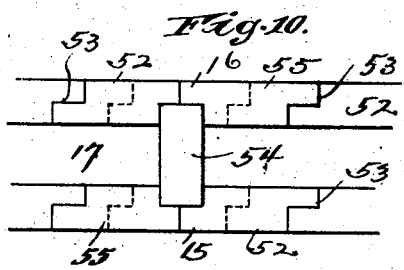
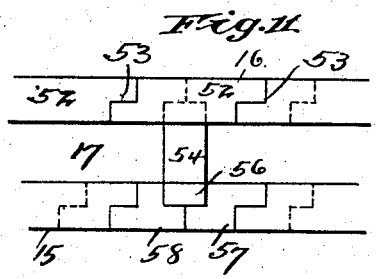
Witnesses,
J. D. Mann
S. N. Pond
Inventor,
Carl Schroeter
By Offield, Towle & Linthicum
Attys.

No. 761,789.

Patented June 7, 1904.

UNITED STATES PATENT OFFICE.

CARL SCHROETER, OF CHICAGO, ILLINOIS, ASSIGNOR TO CHICAGO COKE OVEN CONSTRUCTION COMPANY, OF CHICAGO, ILLINOIS, A CORPORATION OF ILLINOIS.

COKE-OVEN.

SPECIFICATION forming part of Letters Patent No. 761,789, dated June 7, 1904.

Application filed April 20, 1903. Serial No. 153,569. (No model.)

*To all whom it may concern:*

Be it known that I, CARL SCHROETER, a citizen of the United States, residing at Chicago, in the county of Cook and State of Illinois, have invented certain new and useful Improvements in Coke-Ovens, of which the following is a specification.

My invention relates to improvements in coke-ovens of that general type wherein the oven comprises within a single external housing or casing a series of similarly arranged and equipped retorts adapted to treat independent quantities of coal supplied thereto, the several retorts being adapted to effect the coking action solely through the application of external heat, the coking action not being dependent upon heat furnished by combustion within the retorts.

Among the principal objects to be attained by the present invention may be mentioned a more thorough, uniform, and perfect application of heat to the retorts, a substantial decrease in the time usually required for the coking operation, the adaptability of the oven to treat bituminous coals and effect a practically complete desulfurizing thereof, the utilization of the gases driven off from the retorts as the source of heat in an economical and highly efficient manner, an increased utilization of the heating effects produced by the combustion of such gases through the employment of a regenerator through which the otherwise waste heat of the products of combustion is utilized to heat the incoming air necessary to support combustion, a more intense and perfect combustion of the gaseous fuel through its introduction under pressure, facility of repair and renewal of broken or burned-out parts through a novel construction of the walls of the retorts which permits their inner linings to be removed and replaced without disturbing or necessitating the tearing down and rebuilding of the outer portions of their walls or shells, and other minor objects and advantages which will appear later in the subjoined description.

To these and other ends my invention consists partly in a novel and improved structure of multiple-retort coke-oven and partly in a novel and improved construction of the individual retorts and their heating agencies, all as hereinafter more particularly described, and pointed out in the claims.

In the accompanying drawings I have illustrated a coke-oven built in accordance with my present improvements, wherein—

Figure 1 is a front elevational view, broken away at the sides, of the oven, illustrating a group of four sidewise adjacent retorts, it being understood that the rear elevational view is a duplicate thereof, the retorts extending entirely through the oven and provided with similar closures at both ends. Fig. 2 is a vertical sectional view transversely of the retorts, the several retorts from left to right being shown on the lines $a\,b$, $c\,d$, $e\,f$, and $g\,h$, respectively, of Fig. 3. Fig. 3 is a longitudinal vertical section through one of the retorts and its underlying supports on the line $i\,k$ of Fig. 5. Fig. 4 is a longitudinal vertical section through one of the checker-work side walls of a retort on the line $l\,m$ of Fig. 5. Fig. 5 is a horizontal sectional view through three adjacent retorts, the upper retort being shown as cut on the line $n\,o$, the intermediate retort as cut on the line $p\,q$, and the lowermost retort as cut on the line $r\,s$, all of Fig. 3. Fig. 6 is a horizontal sectional view through the upper or roof portion of two adjacent retorts, the upper retort being shown as cut on the line $t\,u$ and the lower retort as cut on the line $v\,w$, both of Fig. 3. Fig. 7 is a longitudinal vertical section on the line $i'\,k'$ of Fig. 5 through the chamber separating two adjacent retorts, illustrating the systems of fuel and air pipes therein. Fig. 8 is a cross-sectional detail view, enlarged, of the upper portion of one of the retorts, illustrating the open checker-work formation of its side walls. Fig. 9 is a longitudinal sectional and interior view of the same on the line $x\,x'$ of Fig. 8. Figs. 10 and 11 are detail horizontal sectional views through one of the side walls of a retort on the lines $y\,y'$ and $z\,z'$, respectively, of Fig. 8; and Figs. 12 and 13 are detail views illustrating the means and manner by and in which the fuel is supplied to and burned in the combustion-chambers and side jackets of the retorts.

Referring to the drawings, 11 designates an external brickwork or other fireproof external housing or casing, resting upon a series of arches 12 and vertical supports 13 and inclosing a series of relatively long narrow retort-chambers 14. The several retorts of the oven being duplicates of each other in constructional features, a description of one will suffice for all. Referring first to the most salient and important novel constructional feature of these retorts, it will be observed that the side walls instead of being formed of solid fireproof bricks throughout, as usual, are made with interior open-work formation, each wall consisting of an inner lining 15, an outer shell 16, and an intermediate open or checker work 17, this construction being more particularly illustrated in Figs. 8, 9, 10, and 11. The immediate top lining of the retort is constituted by a series of transversely-extending fire-clay arch-pieces 18, Figs. 2, 8, and 9, and the bottom wall or sole is constituted by one or more removable fire-clay slabs 19. Fire-clay plates 20, Fig. 3, which may be in two or more sections, are set in the retorts, near the ends thereof, to serve as end walls for the coal charged into the retorts and to prevent the excessive heating of the outer iron doors 21, Fig. 1. The top of the retort consists, as herein shown, of an outer plate or cover 22, between which and the arched top lining 18 is an open or checker work 23. Beneath the soles 19 of the retorts their checker-work sides are continued downwardly, constituting the side walls of combustion-chambers 24, the bottom walls of which latter are constituted by plates 25, having apertures 26 formed therethrough at intervals, said plates resting upon checker-work 27, this latter in turn resting directly or indirectly upon the underlying supporting structure of the retort carried by the arches 12 and vertical supports 13. In the inner linings of the side walls of the combustion-chambers are set longitudinally-extending and endwise-abutting arch-pieces 15$^a$, Figs. 2 and 3, of a thickness somewhat exceeding the thickness of the walls or linings in which they are set, thus providing longitudinal ledges on which may rest the soles 19, and said inner linings of the side walls beneath the chamber of said arch-pieces are interrupted, forming ports or passage-ways 15$^b$, Figs. 3 and 5, through which the flames and products of combustion from the combustion-chamber enter the checker-work of the side walls. The checker-work underlying the floor or base-plate of each combustion-chamber 24 is tapped near each end of the combustion-chamber by the upper end of an air-admission flue 28, the lower end of which latter communicates with a checker-work 29, surrounding and completely enveloping a channel or flue 30, which serves to carry the products of combustion off to a chimney, the discharge-flue 30 and their checker-work envelop or sheathing 29 together constituting regenerators through which the incoming air for combustion is preliminarily heated up to a high temperature prior to its admixture with the gas and the combustion of its oxygen thereby. The discharge-flue 30 communicates with the upper portion of the checkered heating-jacket surrounding the sides and top of each retort through a flue 31 and opening 31$^a$, as plainly shown in Fig. 2. A non-conducting jacket 32, of ash or other material, completely surrounds the top and sides of the walls or heating-jackets of the retorts, this layer of non-conducting material being confined between the outer side walls 33 of the several retort-containing receptacles of the superstructure of the oven, between which side walls 33 are left chambers 34 of a width sufficient to permit entrance by an attendant for the adjustment of fuel and air pipes when necessary, as hereinafter more particularly described.

Through the roof of each retort and its surrounding shell or casing are formed conical charging-openings 35, which can be made air-tight by fire-clay plugs 36, seated in the lower ends of said openings, and cast-iron covers 37. Chimneys or tubes 38 also tap the roof off each retort and serve as outlets for the volatile products driven off by the coking operation, which volatile products may, if desired, be led to and passed through suitable converters to extract therefrom the by-products, while the combustible gas therefrom is returned to the oven to supply when mixed with air and burned the necessary heat which is applied to and through the combustion-chamber and checker-work jackets of the retorts, as next to be described.

39 designates a gas-pipe leading from a source of gas-supply and extending along the front and rear sides of the oven, respectively, slightly below the ends of the several combustion-chambers. From these pipes upwardly-extending branch pipes 40, equipped with suitable cut-off valves 41, Fig. 12, communicate through T-couplings 40$^a$ with burner-tubes 42, extending inwardly from opposite ends of the combustion-chambers along the base thereof, these tubes being provided with minute perforations 42$^a$, Fig. 12. Alongside of the gas-pipe 39 are disposed air-pipes 43, which are in communication with a blower, air-pump, or other source of compressed air, from which pipes 43 extend vertical branch pipes 44, the upper ends of which are turned inwardly and project through the elbows or T-couplings of the gas-pipes, terminating in nozzles 44$^a$ within the burner-pipes 42, the air-pipes being provided with suitable cut-off valves 44$^b$. Also tapping the gas-pipes 39 at points intermediate adjacent retorts and opposite the chambers 34 therebetween are other vertical branch pipes 45, Figs. 1 and 4, the upper ends of which pierce the front and rear walls of the oven and communicate, as best shown in Figs. 2 and 7, with systems of distributing-pipes 46, distributed along the vertical outer side walls 33 of the several retorts, from which systems of distributing-pipes at various points are led short burner-pipes 47 within fire-clay sleeves 48, which place the chambers 34 in communication with the checker-work of the side walls of the retorts. The air-pipes 43 are similarly tapped by other vertical branch pipes 49, Figs. 1 and 4, the upper ends of which are likewise entered through the front and rear walls of the oven into the chambers 34, communicating there with a similar system of air-distributing pipes 50, from which nozzles 51 enter the several burner-pipes 47, as clearly shown in the detail view, Fig. 13.

With the oven as thus constructed the coking operation is carried on substantially as follows: The retorts having been charged with coal through the several charging-openings 35 and the latter and the end openings having been closed and sealed, gas and compressed air are turned on through the pipes 39 and 43 and the several distributing and burner pipes in the combustion-chambers and side-wall heating-jackets of the retorts, the gas being drawn in under the suction created by the air-blast, while the air to support combustion enters through the checker-work 29, constituting the envelop or shell of the regenerator-flue 30, this air rising through the several tubes 28 into the checker-work 27 in the base of the several combustion-chambers, whence the air rises through the openings 26 around the burner-pipes, thus supporting combustion within the combustion-chambers and side jackets, a portion of the air passing upwardly through the checker-work of the side walls of the retort, and thus supporting the combustion of the mixed gas and air issuing through the side burners 47. The gas being thus introduced under the action of a strong air-blast burns vigorously and at an intense heat, and the described distribution of the burner-pipes effects a direct contact of the hot flames and of the incandescent products of combustion over the entire surface of the bottom, side, and top walls or linings of the retorts, the checker-work formation thereof serving to both store and uniformly distribute this intense heat. The products of combustion thus distributed and passed all around the inner walls or linings of the retorts finally pass off through the openings 31ª and discharge-passages 31, whence the products of combustion enter the flue 30 of the regenerator, passing thence to a chimney or other place of final discharge to the atmosphere, in which flue 30 they serve to preliminarily heat the incoming air which supports combustion.

An important feature of the present invention resides in a construction of the walls of the retorts, whereby there is provided not only the described checker-work formation, which facilitates the thorough distribution of the flames and incandescent gases of the fuel and the consequent economical use of the latter, but also the capability of removing the inner lining of the side walls and the soles, when required to be removed, without disturbing the top walls or arches or the outer side and bottom walls and the checker-work. A reference to Figs. 8 to 11, inclusive, will make clear the detail construction whereby this is possible. Each outer side wall 16 is built up by a series of superposed horizontal layers of bricks 52, the ends of which are formed to provide overlapping joints 53 between adjacent bricks for the more perfect retention of the gases and products of combustion between the walls, and successive horizontal layers are so superposed as to break joints, as indicated by the underlying dotted joints. The inner wall or lining 15 is similarly constituted with the exceptions hereinafter described. Alternate horizontal layers in the inner and outer walls are bound together by vertical series of transversely-extending plain rectangular tie-bricks 54, as clearly shown in Figs. 4 and 7 to 10. The ends of the bricks 54 are secured in the respective walls, as follows: That end of one of these tie-bricks which enters the outer wall 16 lies vertically between the solid central portions of the bricks 52 in the next upper and lower layers, while it is embraced horizontally by the notched ends of two endwise-adjacent bricks in the same horizontal layer, for which purpose one of these bricks is specially formed, as shown at 55. The opposite end of the brick 54, which enters the inner wall 15, is similarly embraced laterally by the meeting ends of a regular brick 52 and a specially-formed brick 55; but instead of resting upon the solid central portion of an underlying brick 52 it rests upon a small specially-formed rectangular brick 56, which I call a "filling-brick," of the same dimensions as the end portion of the brick 54 within the wall, this filling-brick 56 itself resting upon the end portion of the next underlying tie-brick 54, and the filler-brick instead of being embraced laterally by a regular brick 52 and a special brick 55 is in order to break joints in the inner wall, as well as in the outer wall, embraced by special bricks 57 and 58, corresponding in contour to the bricks 52 and 55, respectively, but of one-half the length of the latter. By reason of this construction it will be seen that the entire vertical stack of bricks constituting the inner side wall or lining of the retort can be removed without disturbing the arch, which latter is composed of the series of top arch-pieces 18, the ends whereof rest upon other blocks 59, themselves resting upon and longitudinally of the upper ends of the inner side walls 15, since the blocks 59 are supported vertically by the inner ends of the tie-bricks 54 and their interposed filler-bricks 56 when all the other bricks constituting the inner wall or lining of the retort have been removed. The bottom wall or sole 19 of the retort, since it merely rests upon the arch-pieces 15ª in the side walls of the combustion-chamber 24, can also readily be removed and renewed when required.

I have found from actual tests made with an oven constructed and operated as above described that the coking of bituminous coals hitherto regarded as the most difficult to coke can be successfully performed under a continuous application of the heat for a period varying from twelve to twenty-four hours, according to the character of the coal, while, so far as I am aware, this class of coal has heretofore been reduced to coke only with great difficulty, chiefly on account of the large percentage of sulfur contained therein and by the application of heat for at least twice the period of time above specified. The capacity of my improved coke-oven to effect this result I believe to be due principally to the employment of the described heating-jackets constituted by the checker-work formation of the top and side walls of the retorts and the combustion-chambers and the application of the flame and incandescent products of combustion throughout these heating-jackets. The high temperatures which I have been able to attain I believe to be due principally to the introduction of the fuel through the agency of a blast of air, which, so far as I am aware, is new in the art, while the transfer of a large portion of the heat of the spent products of combustion to the incoming air which supports combustion is also a strong auxiliary factor in the production and maintenance of these high temperatures. It is evident that the details of construction whereby these several objects are attained in a coke-oven of this character might be considerably varied and modified without departing from the principle of the invention, and I do not, therefore, limit myself to the described details of construction and arrangement except to the extent indicated in certain of the appended claims.

I claim—

1. In a coke-retort of the character specified the top and side walls whereof are formed with an intermediate checker-work through which the burning fuel and hot products of combustion are circulated, the combination with a combustion-chamber directly beneath the sole of the retort, of means for introducing fuel with air under pressure to support combustion directly into the combustion-chamber and other means for introducing fuel with air under pressure to support combustion directly into the checker-work of the side walls.

2. In a coke-oven of the character specified, the combination with a coke-retort having a heating-jacket entirely surrounding the same, of means for introducing air and fuel to said heating-jacket and burning it therein, and a regenerator comprising air-inlet and gas-discharge conduits one enveloping the other connected to said heating-jacket through which incoming air and the spent products of combustion are passed in opposite directions, substantially as described.

3. In a coke-oven of the character specified, the combination with a coke-retort having a heating-jacket entirely surrounding the same, of means for introducing air and fuel to said heating-jacket and burning it therein, and a regenerator connected to said heating-jacket, said regenerator comprising a gas-discharge conduit and an air-inlet conduit containing checker-work entirely enveloping said gas-discharge conduit, substantially as described.

4. In a coke-oven of the character specified, the combination with a coke-retort having a heating-jacket entirely surrounding the same, of means for introducing air and fuel to the bottom and sides of said heating-jacket and burning it therein, a regenerator comprising air-inlet and gas-discharge conduits one enveloping the other, a connection from said air-inlet conduit to the lower portion of said heating-jacket and a connection from the upper portion of said heating-jacket to said discharge-conduit of the regenerator.

5. In a coke-oven of the character specified, the combination with a coke-retort having a heating-jacket, of a system of pipes for the introduction of gaseous fuel terminating in burners located within the base and sides of said heating-jacket, and another system of pipes for the introduction of air under pressure terminating in injectors located within said burners.

6. In a coke-oven of the character specified, the combination with a series of coking-retorts arranged side by side, of heating-jackets respectively surrounding said retorts, layers of heat-non-conducting material respectively surrounding said heating-jackets, and an external housing embracing all of said retorts, said housing having chambers between adjacent retorts, whereby each retort can be cut out of the series without affecting the others.

7. In a coke-oven of the character specified, the combination with a series of coking-retorts arranged side by side, of heating-jackets respectively surrounding said retorts, layers of heat-non-conducting material respectively surrounding said heating-jackets, an external housing embracing all of said retorts, said housing having chambers between adjacent retorts, a system of valve-regulated fuel-inlet pipes in each of said chambers, and burners connected to said pipes and piercing said non-conducting material and heating-jackets to conduct the flame of the fuel directly into the latter.

8. In a coke-oven of the character specified, the combination with a series of coking-retorts arranged side by side, of heating-jackets respectively surrounding said retorts, layers of heat-non-conducting material respectively surrounding said heating-jackets, an external housing embracing all of said retorts, said housing having chambers between adjacent retorts, a system of valve-regulated blast fuel-inlet pipes in each of said chambers, burners connected to said pipes and piercing said non-conducting material and heating-jackets to conduct the flame of the fuel directly into the latter, a regenerator disposed transversely of said retorts externally of said housing and connected to said heating-jackets through which the heat of the spent gases is imparted to the incoming air.

CARL SCHROETER.

Witnesses:
SAMUEL N. POND,
FREDERICK C. GOODWIN.